United States Patent [19]

Hill

[11] Patent Number: 4,531,090
[45] Date of Patent: Jul. 23, 1985

[54] POSITION TRANSDUCER FOR AN INTERNAL COMBUSTION ENGINE FUNCTION CONTROL SYSTEM

[75] Inventor: William F. Hill, Stafford, England

[73] Assignee: Lucas Industries, Birmingham, England

[21] Appl. No.: 593,431

[22] Filed: Mar. 26, 1984

Related U.S. Application Data

[62] Division of Ser. No. 379,705, May 19, 1982, Pat. No. 4,485,785.

[30] Foreign Application Priority Data

Jun. 5, 1981 [GB] United Kingdom ............... 8117293
Apr. 8, 1982 [GB] United Kingdom ............... 8210580

[51] Int. Cl.³ ........................... G01B 7/14; F02P 5/08
[52] U.S. Cl. ................................ 324/208; 324/232; 123/617
[58] Field of Search ............ 324/207, 208, 232, 173, 324/174; 123/414, 476, 609, 415, 416, 417, 617

[56] References Cited

U.S. PATENT DOCUMENTS

| | | | |
|---|---|---|---|
| 3,626,455 | 12/1971 | Toda | 123/418 |
| 3,703,887 | 11/1972 | Panhard | 123/420 |
| 3,719,177 | 3/1973 | Oishi et al. | 123/476 |
| 3,915,131 | 9/1975 | Brungsberg | 123/414 |
| 3,923,022 | 12/1975 | Scholl | 123/418 |
| 3,941,103 | 3/1976 | Hartig | 123/418 |
| 3,969,303 | 7/1972 | Hartig | 123/418 |
| 4,079,709 | 3/1978 | Schuche | 123/418 |
| 4,181,884 | 1/1980 | Shirasaki | 123/414 |
| 4,338,903 | 7/1982 | Bolinger | 123/414 |
| 4,352,345 | 10/1982 | Menako | 123/414 |
| 4,406,272 | 9/1983 | Kiess et al. | 324/208 |

FOREIGN PATENT DOCUMENTS

| | | |
|---|---|---|
| 2925561 | 10/1980 | Fed. Rep. of Germany . |
| 964645 | 6/1964 | United Kingdom . |
| 1514735 | 7/1978 | United Kingdom . |
| 2004388 | 8/1979 | United Kingdom . |
| 2028511 | 7/1980 | United Kingdom . |

Primary Examiner—Gerard R. Strecker
Assistant Examiner—Walter E. Snow
Attorney, Agent, or Firm—Staas & Halsey

[57] ABSTRACT

An ignition system transducer comprising a ferro-magnetic disc mounted on a distributor shaft and having four pairs of protuberances, the spacing of the two protuberances of each pair corresponding to the maximum and minimum spark advance positions. Rotation of the protuberances about the distributor shaft is detected by a first variable reluctance pick-up mounted in a fixed position, and by a second variable reluctance pickup movable in accordance with an engine load sensor. These two pick-ups in conjunction with signal generators produced a fixed phase waveform, and a variable phase waveform which varies in accordance with engine load.

2 Claims, 7 Drawing Figures

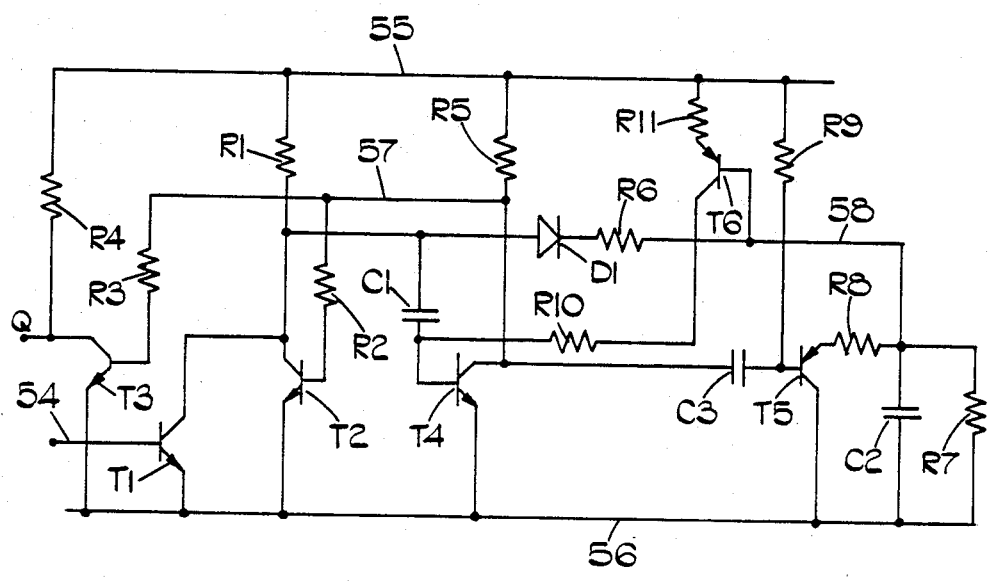

POSITION TRANSDUCER FOR AN INTERNAL COMBUSTION ENGINE FUNCTION CONTROL SYSTEM

This is a division, of application Ser. No. 379,705, filed May 19, 1982 now U.S. Pat. No. 4,485,785.

This invention relates to a position transducer which is usable in controlling both of ignition timing and fuel injection.

In our published United Kingdom patent application No. 2004388 there is described an internal combustion engine function control system comprising first and second signal generating means mechanically driven by the engine, the first signal generating means producing a train of signals at a first frequency equal to the required function frequency, and the second signal generating means producing a train of signals at a second frequency which is a multiple of the first frequency, and engine parameter sensitive means for varying the phase of the first signal train relative to that of the second signal train. The first and second signal trains provide information on crank-shaft speed and position and also on the engine parameter.

In this system, the second signal generating means provides a signal train at a frequency which is a multiple of the required function frequency so that signals are available at intervals of crank-shaft rotation small enough to avoid appreciable errors such as those which might otherwise occur during rapid acceleration of the engine at low speeds.

In the case of an ignition system, the ignition coil turn-on time is more susceptible to appreciable errors than the turn-off time as delay in turn-on time of the ignition coil results in the coil being insufficiently energised before a spark is triggered. It has been found that the need for accuracy in ignition coil turn-on time can be reduced by advancing the ignition coil turn-on time, for example, in response to the rate of throttle opening or to the difference in successive ignition cycle times, or by permanently advancing the coil turn-on time where this can be done at an acceptable cost. In the case of coil turn-off time, it has been found that delay may be beneficial in preventing misfire in the case of a lean burn system in which there is a delay in the fuel system response.

Accordingly, it is an object of this invention to provide a new and simplified position transducer.

According to this invention there is provided an internal combustion engine function control system comprising a position transducer mechanically driven by the engine for providing a first signal train and a second signal train, an engine parameter sensitive means for varying the phase of the first signal train relative to the second signal train, function timing means responsive to the first signal train and the second signal train, and an output circuit triggered by the function timing means, wherein both the first signal train and the second signal train have a frequency equal to the required function frequency.

The position transducer of the present invention comprises a body; a rotary part mounted on the body, at least one protuberance on said body and at least one protuberance on the rotary part; first means for producing magnetic flux, said protuberances and said first magnetic flux producing means forming a part of a first magnetic circuit the reluctance of which varies as the rotary part rotates relative to the body; a movable element having at least one protuberance and being mounted on the body so as to be angularly movable relative to the body and independently movable relative to the rotary part; second means for producing magnetic flux and arranged to provide an opposite direction of magnetic flux to the first magnetic flux producing means, said at least one protuberance on the rotary part, said at least one protuberance on the movable element and said second magnetic flux producing means together forming a part of a second magnetic circuit the reluctance of which varies as the rotary part rotates relative to the movable element; a pick-up winding magnetically linked with both said first magnetic circuit and said second magnetic circuit in which an electrical signal is generated as a result of the change in reluctance in said magnetic circuits as the rotary part is turned relative to the body; and a discriminating circuit connected to the winding and providing distinct output signals in response to the protuberance on the rotary part passing close to the protuberance on the body and the protuberance on the rotary part passing close to the protuberance on the movable element.

By providing both the first and second signal trains at the required function frequency, the design of the signal generating means and the function timing means may be simplified.

The position transducer of the present invention will now be described in more detail by way of example with reference to the accompanying drawings in which:

FIG. 3 is a circuit diagram of an analog pulse forming circuit forming part of the system shown in FIG 1;

FIG. 4 is an elevational view of a transducer which is used in a modification of the system shown in FIG. 1;

FIG. 5 is a section on line 5—5 in FIG. 4;

Figure 1:
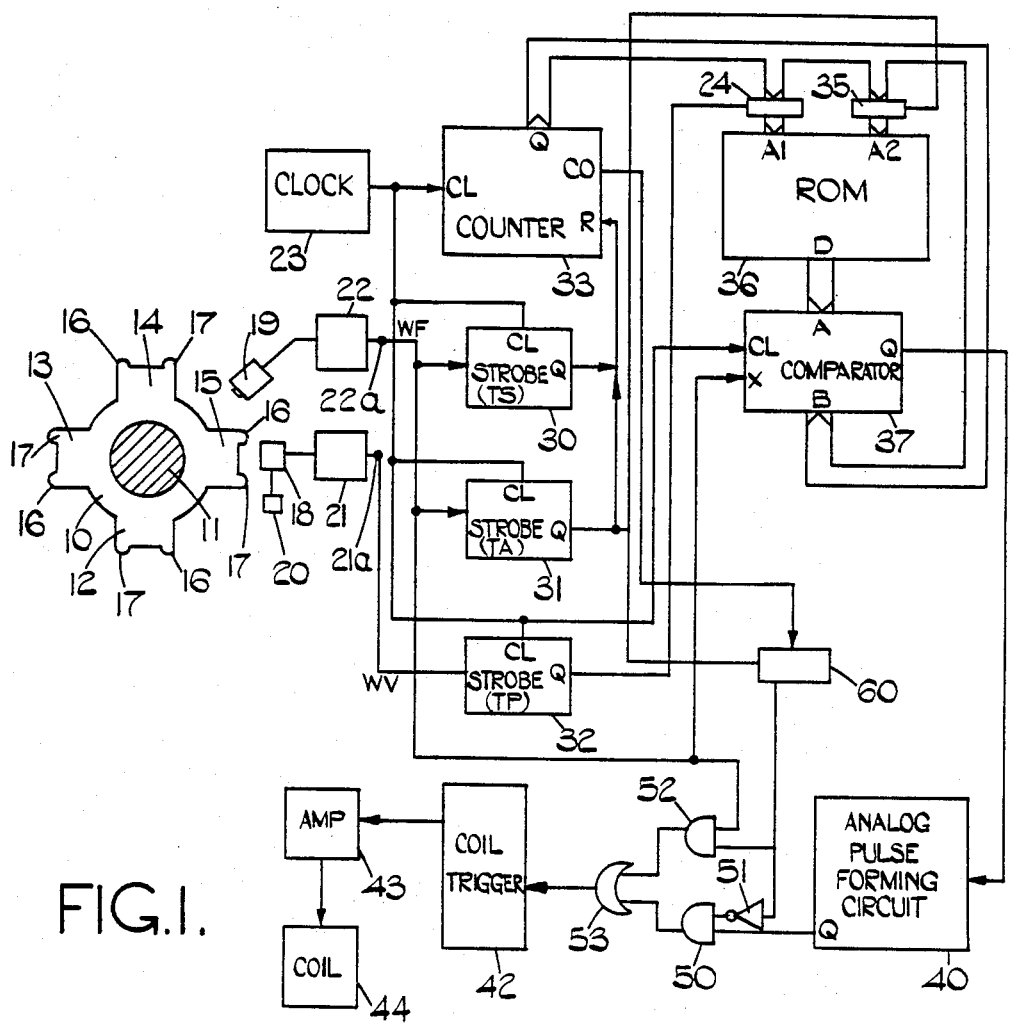
FIG. 1 is a block diagram of a spark ignition control system embodying this invention.

Referring now to FIG. 1, there is shown a spark control system in a four cylinder four stroke internal combustion engine. The system includes a rotor in the form of a ferro-magnetic disc 10 mounted on the distributor shaft 11, the shaft 11 being driven by the engine. The disc 10 has four projections 12, 13, 14 and 15. Each of the projections is provided with a pair of protuberances 16, 17. The disc 10 co-acts with a pair of angularly spaced variable reluctance type pick-ups 18 and 19, the pick-up 18 being angularly movable by an engine load sensor 20 and the pick-up 19 being mounted in the fixed position. The engine load sensor 20 is of well known construction and senses air pressure at a point downstream of the carburettor throttle value. The pick-up 18 is connected to the input of a signal generator 21 and the pick-up 19 is connected to the input of a signal generator 22. The pick-ups 18 and 19 may each take the form of the pick-ups shown in FIG. 2 of my co-pending U.S. application filed Feb. 17, 1982 and entitled 37 Position Transducer" and the signal generates 21 and 22 may each take the form of the circuit shown in FIG. 3 of that application.

Figure 2:
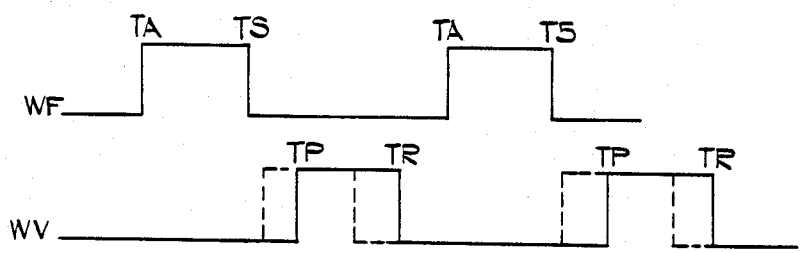
FIG. 2 shows waveforms of signals generated in the system of FIG. 1.

As shown in FIG. 2, the signal generator 22 produces a rectangular-waveform WF of fixed phase. In the waveform WF, each rising edge is denoted by TA and each falling edge is denoted by TS, the rising edges TA corresponding to maximum spark advance and the falling edges TS corresponding to minimum spark advance. The transition from TA to TS represents 60° of crank-shaft rotation. The signal generator 21 produces a rectangular-waveform WV at which each rising edge is represented by TP and each falling edge is represented by TR. The phase of the waveform WV may be varied by the load sensor 20 in accordance with engine load, and in FIG. 2 the waveform shown in full lines corresponds to maximum depression of the sensed air pressure below atmospheric pressure and the waveform shown in dotted lines corresponds to minimum depression. It is to be noted that the phase of the waveform WV is varied between limits such that the ordinal succession of the edges TA, TS, TP remains constant.

The output of the signal generator 22 is connected through a terminal 22a to the inputs of two strobe circuits 30, and 31, the strobe circuit 30 detecting each falling edge TS and the strobe circuit 31 detecting each rising edge TA. The output of the signal generator 21 is connected through a terminal 21a to the input of a strobe circuit 32 which detects each rising edge TP of the waveform WV. The system also includes a clock pulse generator 23, the output of which is connected to the clock inputs CL of strobe circuits 30, 31 and 32 and also to the clock input CL of a counter 33. The counter 33 produces a multi-bit output Q which is supplied via latches 34 and 35 to the multi-bit address inputs A1 and A2 of read-only-memory (ROM) 36. The outputs Q of strobes 30 and 31 are both connected to the reset input R of counter 33 and the output of strobe 31 is also connected to the clock input of latch 35. The output Q of strobe 32 is connected to the clock input of latch 34.

In operation, the counter 33 is reset at each edge TA or TS. Also, at each edge TA the latch 35 is clocked and so the data provided to the address input A2 of ROM 36 represents the time from edges TS to TA, this time being inversely proportional to the engine speed. At each edge TP, the latch 34 is clocked and so the data provided to the address input A1 represents the time from edges TS to edge TP which represents engine load as sensed by sensor 20 at the prevailing speed.

The ROM 36 is programmed in accordance with an empirically derived ignition timing schedule and selects an output word in accordance with its inputs, the output word corresponding to the counter output state during the time from the edge TA to the edges TS at which a spark is required. The output D of ROM 36 is connected to an input A of a comparator 37, the other input B of which receives the output Q from the counter 33. The comparator 37 has an enable input X which receives the waveform WF from signal generator 22 and the comparator 37 also has a clock input CL which is provided with the output of the clock 33. The comparator 33 is arranged to compare the data at its inputs A and B when high signal is provided at its enable input X and to provide a signal at its output Q when the data at these inputs are identical.

The output Q of comparator 37 is connected to the input of an analog pulse forming circuit 40, the output Q of which is connected to one input of an AND gate 50. The other input of AND gate 50 is connected to the output of an inverter 51, the input of which is connected to the output of a latch 60. The output of latch 60 is also connected to the input of another AND gate 52, the other input of which receives waveform WF directly from the signal generator 22. The input of latch 60 is connected to the carry-out output CO of counter 33 and the clock input of latch 60 is connected to the output Q of strobe 31. The outputs of the two AND gates 50 and 52 are connected respectively to the two inputs of an OR gate 53, the output of which is connected to the input of a coil trigger 42, which comprises a buffering DC amplifier with internal re-generation. The output of coil trigger 42 is connected to a power amplifier 43 which drives an ignition coil 44.

Referring now to FIG. 3, there is shown a circuit diagram for the analog pulse forming circuit 40. The analog pulse forming circuit 40 comprises an input rail 54 which is connected to the base of an NPN transistor T1, the emitter of which is connected to a negative supply rail 56 and the collector of which is connected through a resistor R1 to a positive supply rail 55. The collector of transistor T1 is also connected to the collector of an NPN transistor T2, the emitter of which is connected to the rail 56 and the base of which is connected through a resistor R2 to a rail 57. The rail 57 is connected through a resistor R3 to an output NPN transistor T3, the emitter of which is connected to the rail 56 and the collector of which is connected through a pull-up resistor R4 to a rail 55. The collector of transistor T3 also forms the output Q for the analog pulse forming circuit 40.

The rail 57 is connected through a resistor R5 to rail 55 and also to the collector of an NPN transistor T4, the emitter of which is connected to the rail 56 and the base of which is connected through a capacitor C1 to the collector of transistor T2. The collector of transistor T2 is also connected to the anode of a diode D1, the cathode of which is connected through a resistor R6 to a rail 58. The rail 58 is connected through a capacitor C2 and a resistor R7, connected in parallel, to the rail 56, and also through a resistor R8 to the emitter of a PNP transistor T5. The collector of transistor T5 is connected to rail 56 and the base is connected through a resistor R9 to rail 55 and also through a capacitor C3 to the collector of transistor T4. The rail 58 is also connected to the base of a PNP transistor T6, the emitter of which is connected through a resistor R11 to the rail 55 and the collector of which is connected through a resistor R10 to the base of transistor T4. It is to be noted that the resistance of resistor R7 is much greater than the combined resistance of resistors R1 and R6.

The operation of the analog pulse forming circuit 40 will be described with the output latch 60 low so that the coil trigger 42 is driven by the output of this circuit.

In the quiescent condition, transistor T6 supplies a small base current to transistor T4 which is sufficient to hold it on in a saturated state thereby holding off transistors T2 and T3. In this condition, capacitor C1 becomes charged by resistor R1. When the inputs A and B of comparator 37 are identical, a trigger pulse is supplied to the base of transistor T1. This causes transistor T1 to turn on and, as capacitor C1 is charged, it also causes transistor T4 to turn off. This causes transistor T2 to turn on thereby holding transistor T4 in the off state until capacitor C1 has been discharged by transistor T6, at which stage transistor T4 again turns on thereby turning off transistor T2 and permitting capacitor C1 to become charged via resistor R1. When transistor T4 is turned off, it turns on transistor T3 thereby turning off the coil 44 and, when transistor T4 is turned on, it turns off transistor T3 thereby turning on coil 44.

Thus, the coil 44 is turned off each time the inputs A and B of comparator 37 are identical and it is turned on at a time determined by the pulse forming circuit 40.

The period for which the coil 44 is turned off varies with engine speed and this will now be explained. Each time transistor T4 is turned on, capacitor C3 applies a negative pulse transistor T5 thereby almost completely discharging capacitor C2. Capacitor C2 is then charged through resistors R1 and R6 rather more slowly than capacitor C1 is charged by resistor R1. As engine speed increases, transistor T1 is triggered at progressively decreasing time intervals with the result that the voltage obtained by capacitor C2 prior to each triggering fails progressively and thereby causing transistor T6 to conduct more current whilst capacitor C1 is discharging thereby shortening the off time of transistor T4 towards a limit set by resistor R10 when T6 is saturated. Further increase in engine speed, and hence in triggering frequency, results in capacitor C1 charging less thereby causing a further reduction in the off time of transistor T4 towards a constant mark-space ratio with transistor T4 on for about 80% of cycle time at highest engine speed.

The counter 33 is self inhibiting when reaching a pre-set upper count and, when this count is reached, the signal at its carry-out output CO goes high thereby causing the output of latch 60 to go high. The pre-set upper count corresponds to a slow idling speed of the engine and may, for example, be 500 revolutions per minute. When the output of latch 60 is high, AND gate 52 is enabled so that the coil trigger circuit 42 is driven by the waveform WF. The analog pulse forming circuit 40 is arranged so that at the slow idling speed the coil turns on at a time which is later than each rising edge TA. Thus, the coil 44 is always off when gate 50 is enabled and gate 52 is disabled in response to rising engine speed thereby obviating spurious mistimed sparks. During powering up, the carry-out signal CO is high so that the coil is driven by the waveform WF.

It is to be noted that in order to avoid sampling transitional states of comparator 37, a two phase clock should be used.

If desired, the size of ROM 36 may be reduced by including circuitry between clock 23 and counter 33 which provides progressive reduction of clock pulse frequency with cycle time. The length of the data word stored by ROM 36 may be reduced by dividing the clock frequency by a number which is inversely proportional to the engine speed so as to produce pulses corresponding to incremental movement of the engine crankshaft. Ignition delay may then be performed by counting these incremental pulses.

Figure 6:
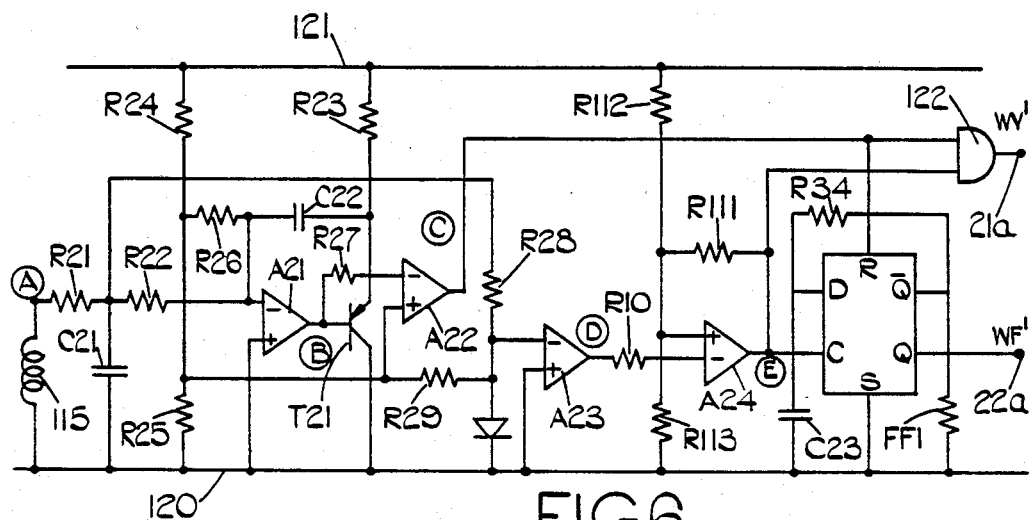
FIG. 6 is a circuit diagram of a discriminating circuit which forms part of the transducer of FIG. 4.

Turning now to FIGS. 4 to 6 there is shown a transducer which may replace the disc 10, pick-ups 18, 19 and signal generators 21, 22 in the system shown in FIG. 1.

Referring firstly to FIGS. 4 and 5, the transducer includes a body 110 on which a shaft 111 is rotatably mounted (no bearings being shown). The body 110 and shaft 111 form part of a distributor, the shaft 111 being driven by the engine. A rotary member 112 is mounted on the shaft and is provided with four equiangularly spaced flat fin-like radially outwardly projecting protuberances 112a. Fixedly mounted on the body is an arcuate member 113 which is co-axial with the shaft 111 and which has two sets of diametrically opposite radially inwardly projecting flat fin-like protuberances 113a and 113b. An arcuate magnet 114 is sandwiched between the member 113 and the body 110 and is magnetised axially so as to provide a south pole face abutting the body and a north pole face abutting the member 113.

The body 110, the magnet 114, the member 113 with its protuberances, the rotary member 112 with its protuberances and the shaft 111 form a magnetic circuit, the reluctance of which varies as the member 112 rotates relative to the body. Reluctance minima occur each time a diametrically opposed pair of protuberances 112a pass close to a diametrically opposed pair of the protuberances 113a and 113b.

A pick-up winding 115 is mounted on the body and surrounds the shaft 111, so that it is linked to the magnetic circuit and produces an output signal when the rotary member 112 is turned relative to the body 110. The winding 115 is connected to a terminal block 115a.

Mounted on the body 110 so as to be angularly movable about the shaft axis is an angularly movable element 116 on which there is mounted a further magnet 117 and a protuberance in the form of a finger 118. The element 116 is driven by an engine load sensor, not shown, of well known construction and which senses air pressure downstream of the carburettor throttle valve. The magnet 117 has its north pole face adjacent element 116 and its south pole face adjacent finger 118. The magnet 117, element 116, finger 118, rotary member 112, and shaft 11 form a second magnetic circuit, which has a reluctance minimum whenever the finger 118 is close to one of the protuberances 112a. The pick-up winding 115 is thus also linked to this second magnetic circuit, which provides a magnetic field in the vicinity of the winding 115 opposite that produced by the magnet 114.

Turning now to FIG. 6, the discriminating circuit includes a low pass passive RC filter R21, C21 connected across the winding, one end of which is grounded to a ground rail 120. The output of this filter is connected by a resistor R22 to the inverting input of an operational amplifier A21, the non-inverting input of which is grounded to rail 120. A feedback capacitor C22 is connected between the inverting input of amplifier A21 and the emitter of a pnp transistor T21 having its base connected to the output of amplifier A21, its collector connected to the rail 120 and its emitter connected by a resistor R23 to a +5 v rail 121. The amplifier A21 thus acts as an active integrator which provides an output representing the integral of the voltage generated in the winding 115, that is to say it represents the variation of the magnetic flux in the winding 115. A pair of resistors R24, R25 connected in series between the rails 120, 121 have their junction, which is at a voltage of about +100 mV, connected via a resistor R26 to the inverting input of the amplifer A21. The resistor R26 is of high value compared with the resistor R22 and acts to cause the output of the amplifier A21 to drift relatively slowly towards the voltage of rail 120, so that in quiescent conditions the output stage of amplifier A21 becomes saturated.

The output of amplifier A21 is connected to the inverting input of an operational amplifier A22 by a resistor R27. The non-inverting input of amplifier A22 is connected to the junction of resistors R24 and R25 and amplifier A22 operates open-loop as a voltage comparator.

The output of the filter R21, C21 is also connected via a resistor R28 to the inverting input of an operational amplifier A23, which has its non-inverting input grounded. A high value resistor R29 connects the junction of resistors R24 and R25 to the inverting input of amplifier A23 which acts as a zero-crossing detector together with a further operational amplifier A24 connected as an inverting Schmitt trigger circuit. Thus amplifier A24 has its inverting input connected by a resistor R110 to the output of amplifier A23 and its non-inverting input connected by resistors R111, R112 and R113 to its own output, the rail 121 and the rail 120 respectively. Amplifier A24 provides an output with rapid transitions between high and low output levels when the winding 115 output voltage changes polarity.

The output of amplifier A24 is connected to the clock input C of a D-type flip-flop circuit FF1, which has its set input S grounded and its $\overline{Q}$ output connected by a resistor R34 to the data input D which is connected by a capacitor C23 to rail 120. The reset input R of circuit FF1 is connected to the output of amplifier A22.

The output of amplifier A22 is connected to one input of an AND gate 122, the other input of which is connected to the output of amplifier A24.

Figure 7:
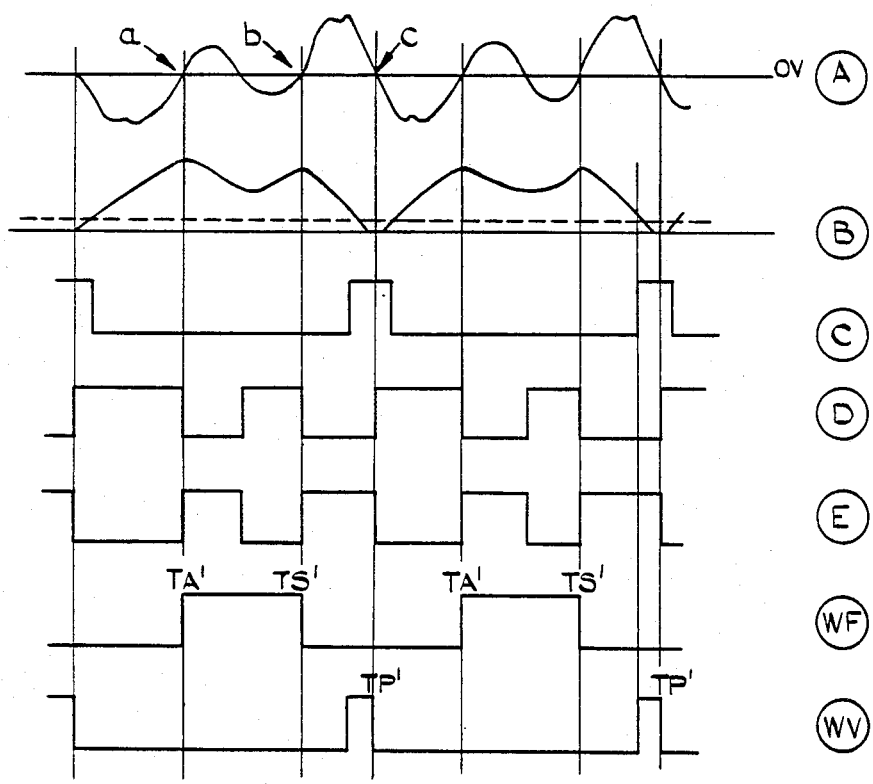
FIG. 7 shows voltage waveforms at various points in the circuit of FIG. 6.

Turning now to FIG. 7, the general form of the winding output is shown in line A, the positive going zero crossings a and b indicating the passage of the protuberances 112a close to the protuberances 113a and 113b and the negative going zero crossing c indicating the passage of a protuberance 112a close to the finger 118. Line B to E indicate the waveforms at the similarly marked points in FIG. 6.

Also as shown in FIG. 7, the Q output of flip-flop FF1 produces a rectangular waveform WF' of fixed phase. In the waveform WF', each rising edge is denoted by TA' and each falling edge is denoted by TS', the rising eges TA' corresponding to maximum spark advance and the falling edges TS' correspondig to minimum spark advance. The output of AND-gate 122 produces a rectangular WV' in which each falling edge is represented by TP'. The phase of the edges TP' is varied by the load sensor in accordance with engine load. It is to be noted that the edges TP' are varied within limits such that the ordinal succession of the edges TA', TS', TP' remains constant.

As may be readily appreciated, the waveforms WF' and WV' are similar to the waveform WF and WV of FIGS. 1 and 2. Thus, the output of gate 122 and the Q output of flip-flop FF1 may be connected to the terminals 21a and 22a in place of the outputs of signal generators 21 and 22. In this alternative arrangement, the strobe 22 is modified to detect the falling edges TP'.

In a further modification the disc 10 and pick-ups 19, 20 shown in FIG. 1 may be replaced by a pair of Hall-effect sensors, a suitable example being the series 1AV vane operated position sensors produced by the Microswitch Division of Honeywell Europe S.A., AV Henri Matisse 16, 1140 Brussels.

Although the invention has been described with reference to a spark ignition system, it may also be applied to other aspects of internal combustion engine function control such as to the timing of fuel injection in diesel engines and the metering of fuel in both petrol and diesel engines.

I claim:
1. A transducer comprising:
 a body having at least one protuberance;
 a rotary part mounted on the body and having at least one protruberance;
 first means for producing magnetic flux, said protuberances and said first magnetic flux producing means forming part of a first magnetic circuit the reluctance of which varies as the rotary part rotates relative to the body;
 a movable element having at least one protuberance and being mounted on the body so as to be angularly movable relative to the body and independently movable relative to the rotary part;
 second means for producing magnetic flux and arranged to provide an opposite direction of magnetic flux to the first magnetic flux producing means, said at least one protuberance on the rotary part, said at least one protuberance on the movable element and said second magnetic flux producing means together forming a part of a second magnetic circuit the reluctance of which varies as the rotary part rotates relative to the movable element;
 a pick-up winding magnetically linked with both said first magnetic circuit and said second magnetic circuit in which an electrical signal is generated as a result of the change in reluctance in said magnetic circuits as the rotary part is turned relative to the body; and
 a discriminating circuit connected to the pick-up winding and providing distinct output signals in response to the at least one protuberance on the rotary part passing close to the at least one protuberance on the body and the at least one protuberance on the rotary part passing close to the at least one protuberance on the movable element.

2. A transducer as claimed in claim 1 wherein the discriminating circuit includes:
 an integrating circuit connected to integrate the signals generated in the winding;
 a comparator comparing the integrating circuit output with a predetermined reference signal; and
 a zero crossing detector circuit for detecting zero crossings in the signals generated in the winding.

* * * * *